G. W. GWINN.
MACHINE FOR PACKAGING MATERIALS.
APPLICATION FILED JULY 8, 1909.

1,058,579.

Patented Apr. 8, 1913.
14 SHEETS—SHEET 3.

Witnesses
H. E. Montague
Fannie Wise

Inventor:
George W. Gwinn,
By Dodge and Sons,
Attorneys

G. W. GWINN.
MACHINE FOR PACKAGING MATERIALS.
APPLICATION FILED JULY 8, 1909.

1,058,579.

Patented Apr. 8, 1913.

14 SHEETS—SHEET 4.

Witnesses
Inventor
George W. Gwinn,
By
Dodge and Sons
Attorneys

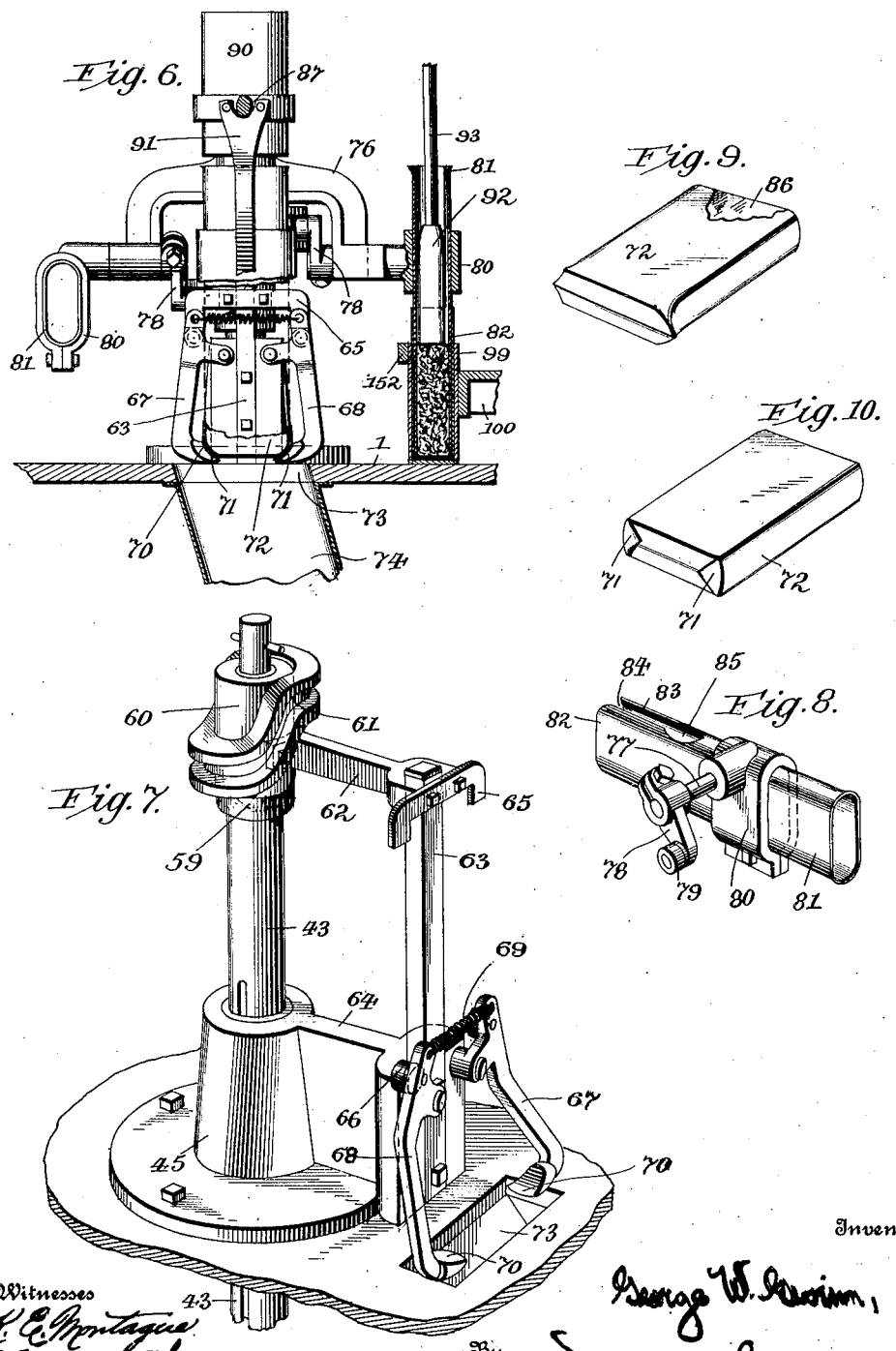

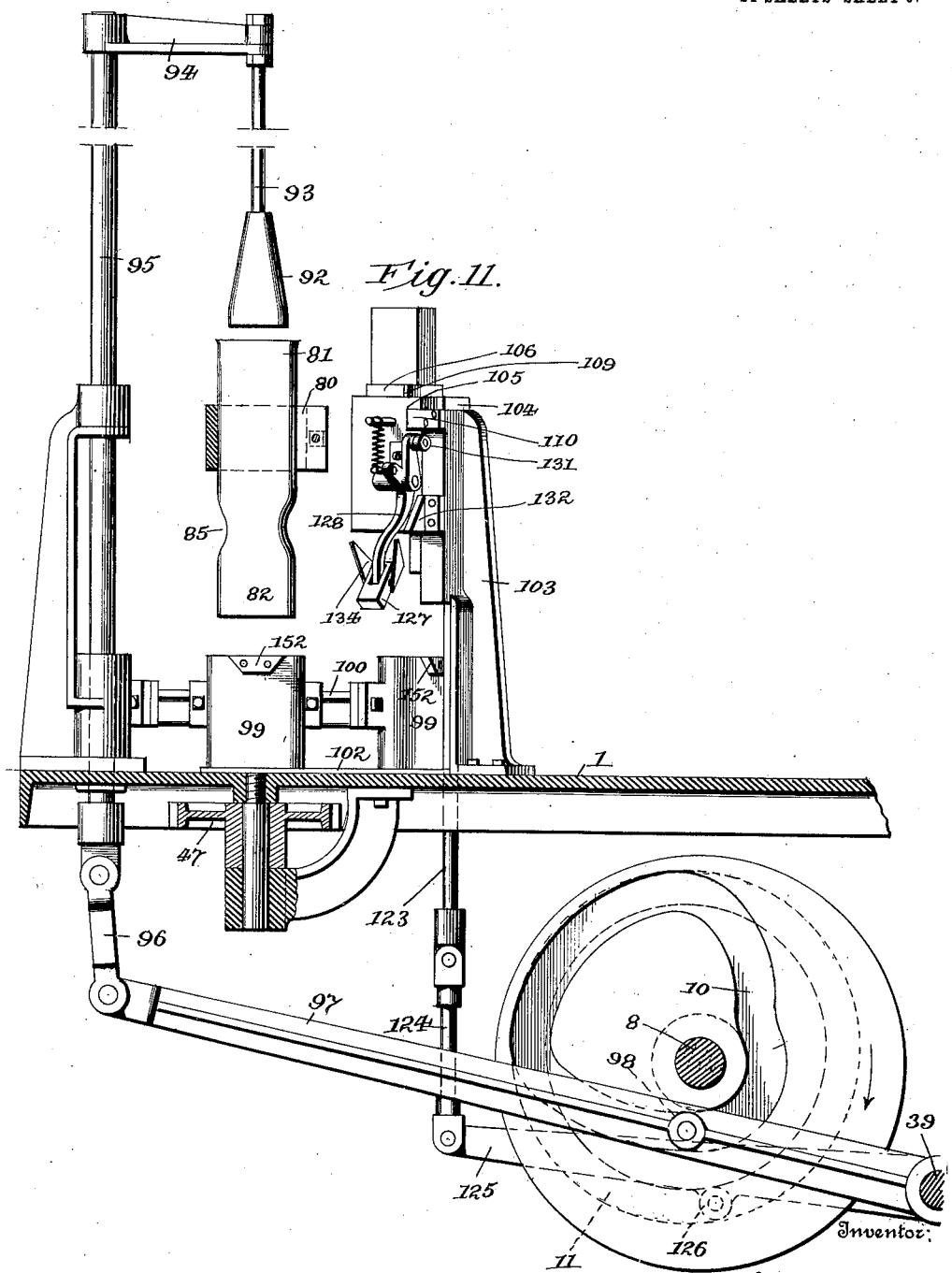

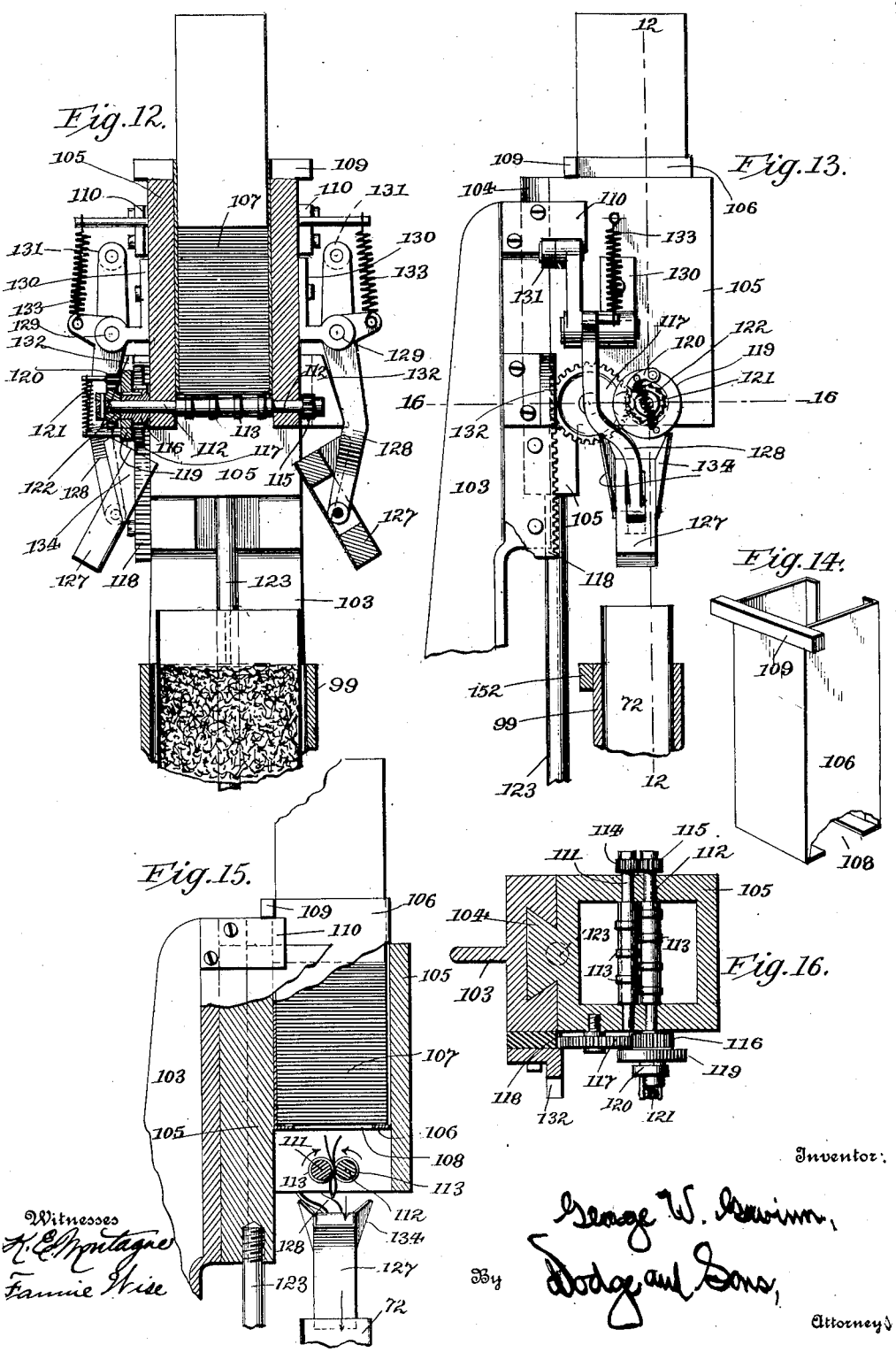

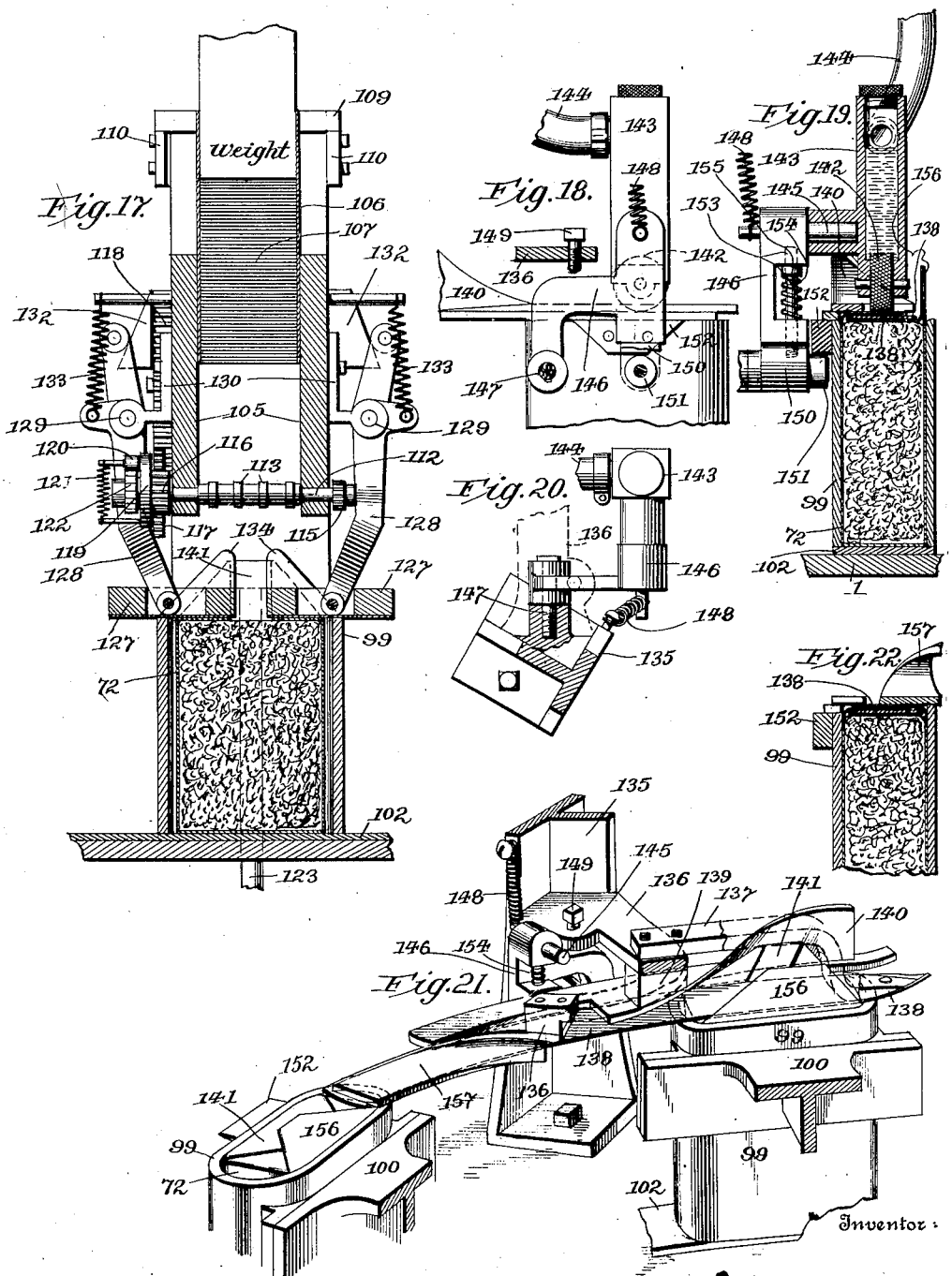

G. W. GWINN.
MACHINE FOR PACKAGING MATERIALS.
APPLICATION FILED JULY 8, 1909.
1,058,579.
Patented Apr. 8, 1913.
14 SHEETS—SHEET 9.
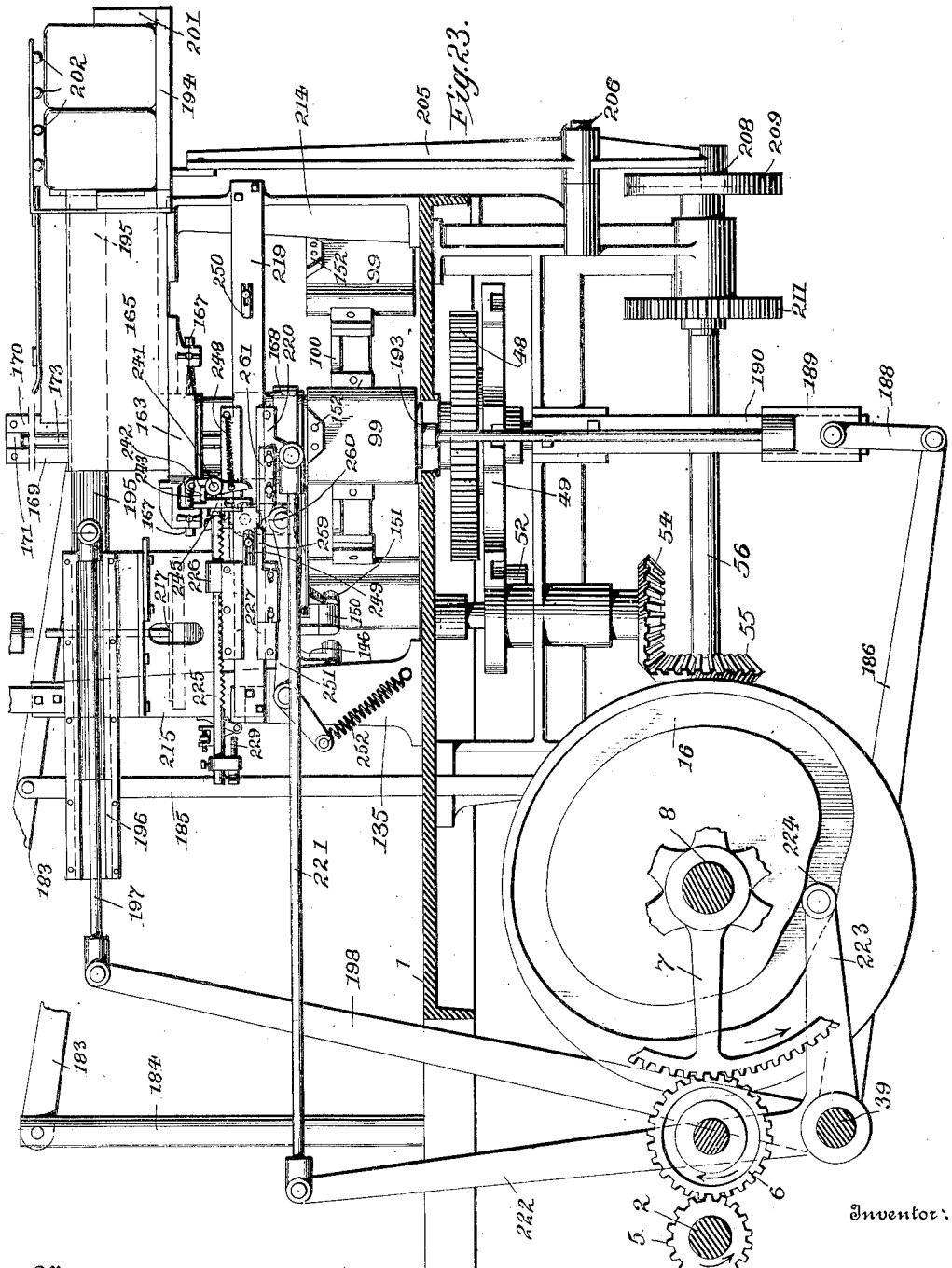
Witnesses
L. E. Montague
Fannie Huse
Inventor:
George W. Gwinn,
By Dodge and Sons
Attorneys.

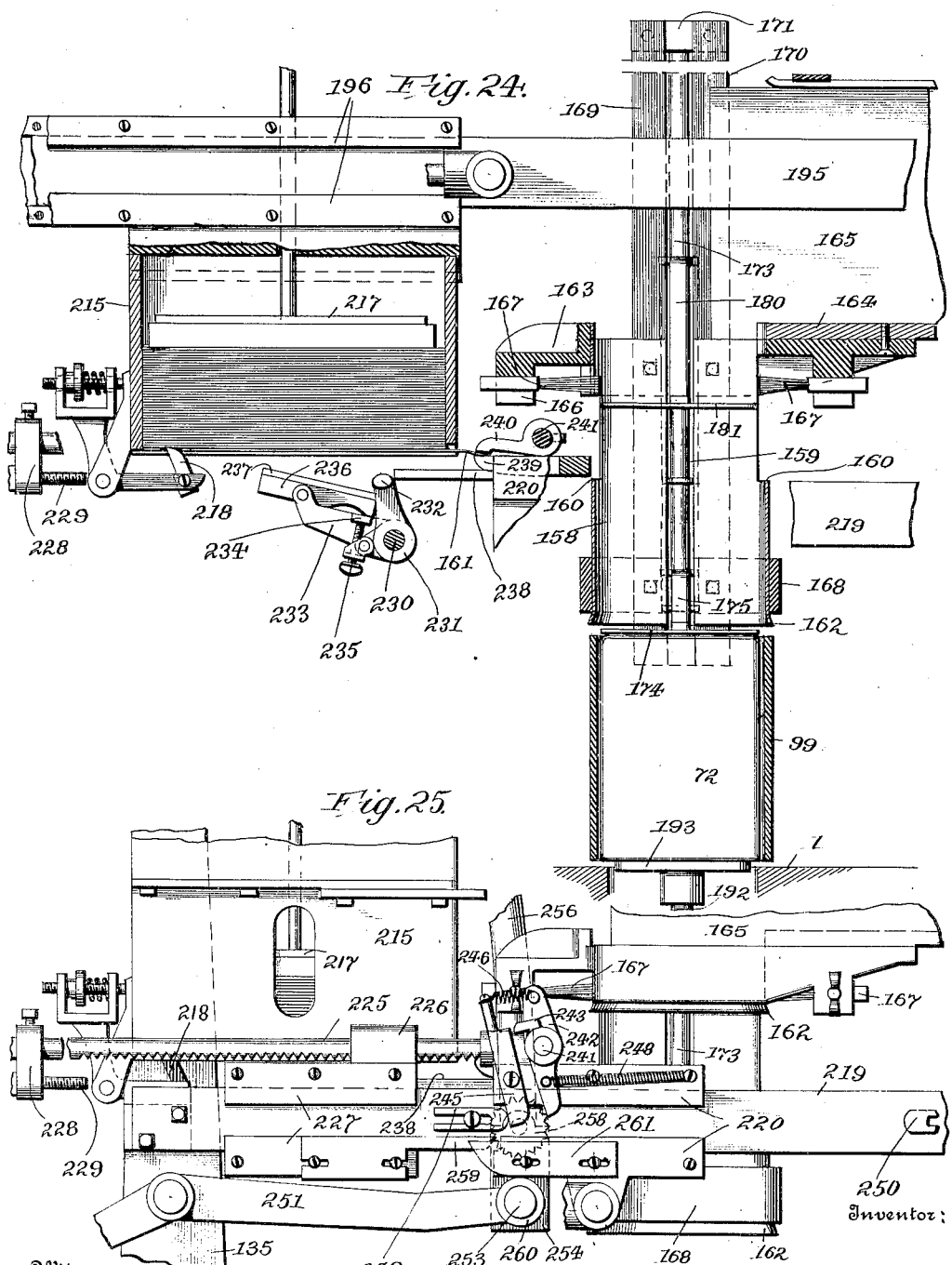

G. W. GWINN.
MACHINE FOR PACKAGING MATERIALS.
APPLICATION FILED JULY 8, 1909.
1,058,579.
Patented Apr. 8, 1913.
14 SHEETS—SHEET 11.
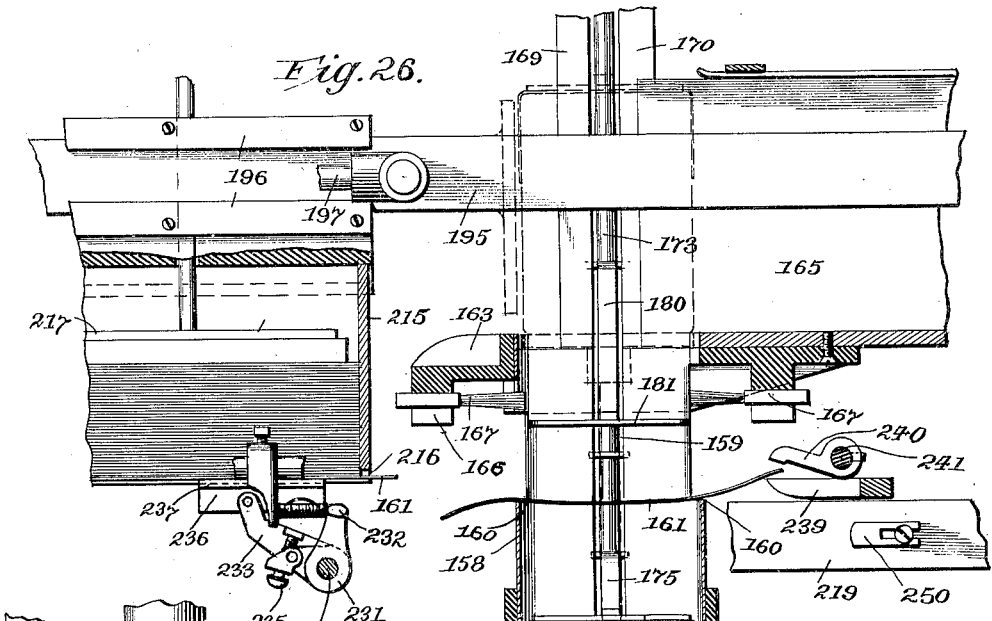
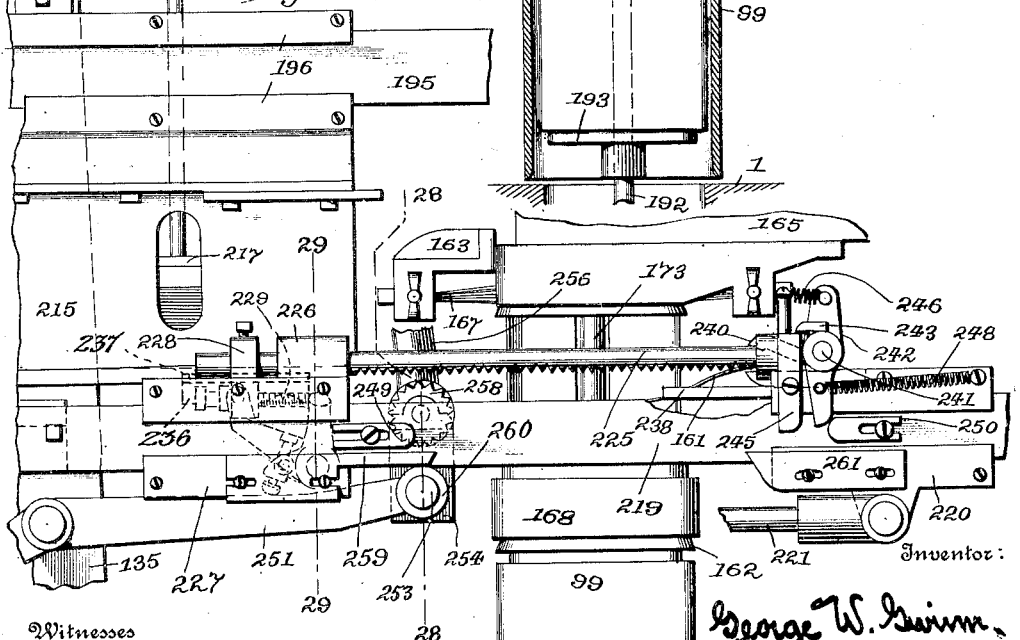
Witnesses
H. C. Montague
Fannie Wise
Inventor:
George W. Gwinn
By
Dodge and Sons
Attorneys G. W. GWINN.
MACHINE FOR PACKAGING MATERIALS.
APPLICATION FILED JULY 8, 1909.
1,058,579.
Patented Apr. 8, 1913.
14 SHEETS—SHEET 12.
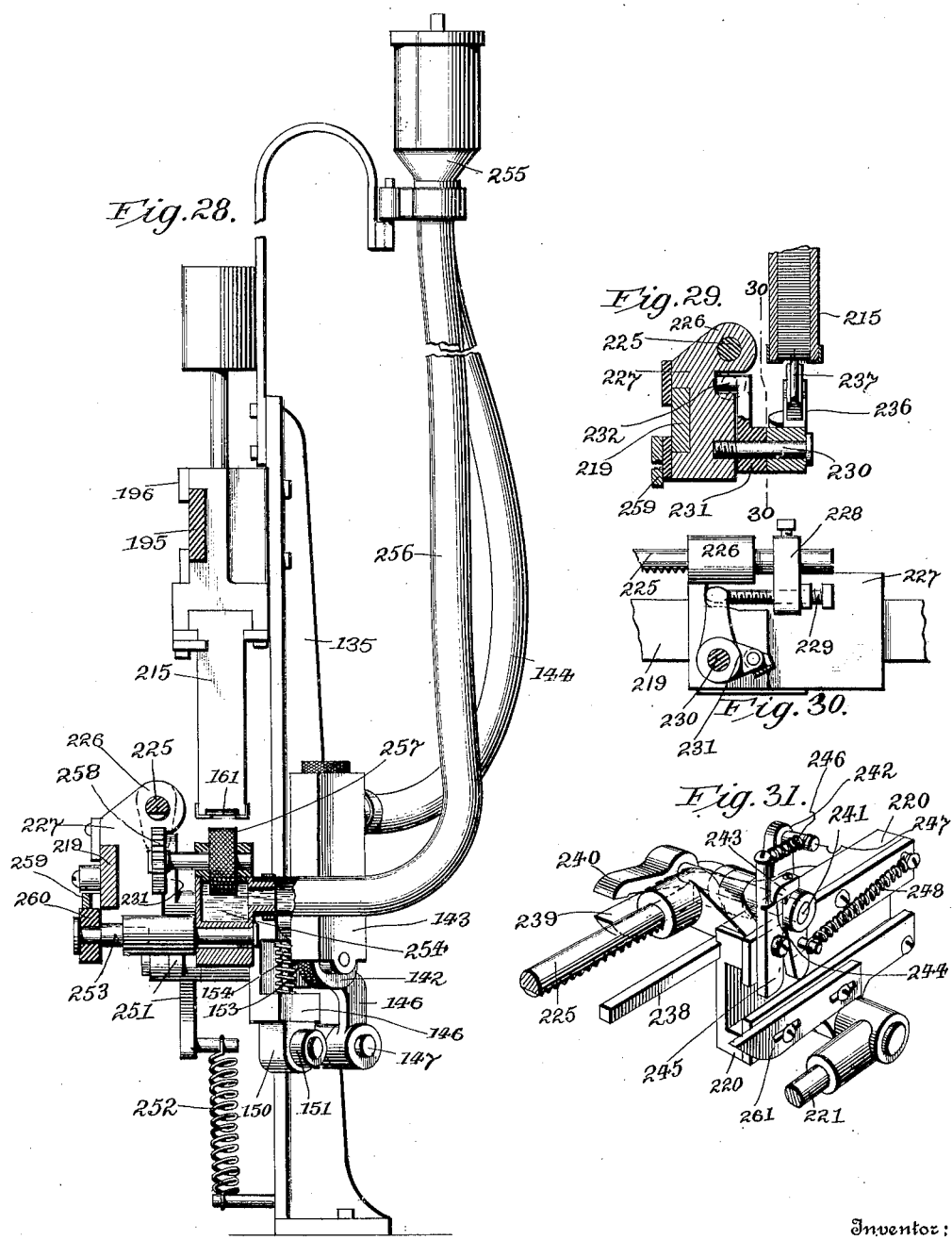

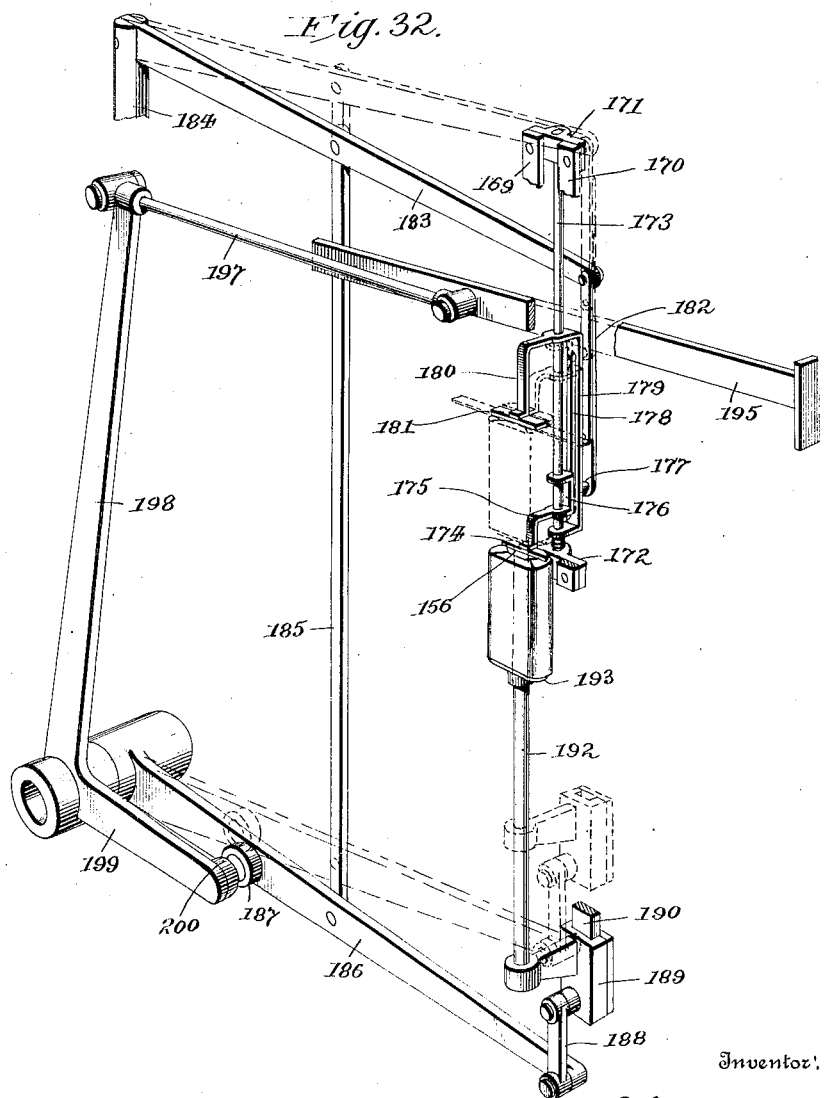

G. W. GWINN.
MACHINE FOR PACKAGING MATERIALS.
APPLICATION FILED JULY 8, 1909.
1,058,579.
Patented Apr. 8, 1913.
14 SHEETS—SHEET 14.
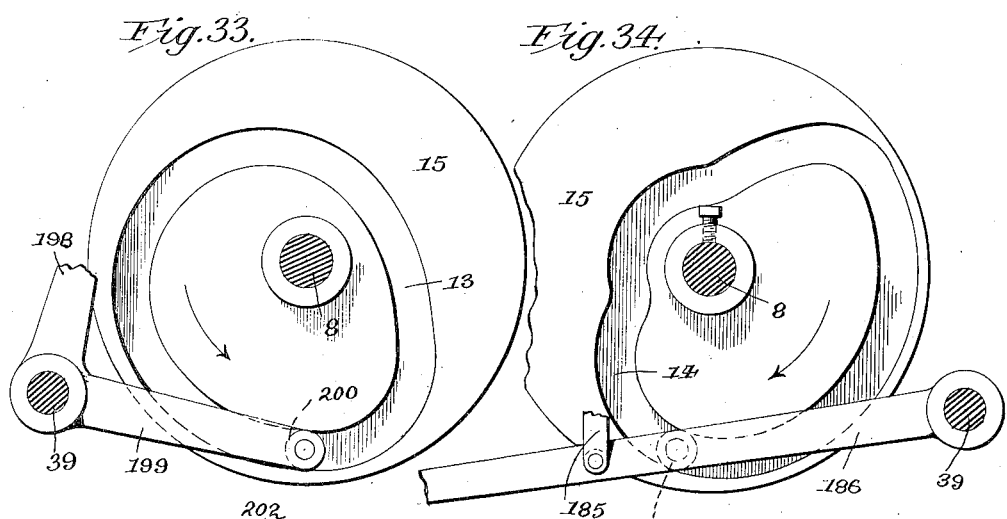

UNITED STATES PATENT OFFICE.

GEORGE W. GWINN, OF NEW YORK, N. Y., ASSIGNOR TO AUTOMATIC PACKING & LABELING COMPANY, OF DURHAM, NORTH CAROLINA, A CORPORATION OF NORTH CAROLINA.

MACHINE FOR PACKAGING MATERIALS.

1,058,579.  Specification of Letters Patent.  Patented Apr. 8, 1913.

Application filed July 8, 1909. Serial No. 506,579.

*To all whom it may concern:*

Be it known that I, GEORGE W. GWINN, a citizen of the United States, residing at New York, in the county of New York and State of New York, have invented certain new and useful Improvements in Machines for Packaging Materials, of which the following is a specification.

My present invention pertains to improvements in machines for packaging materials, the construction and advantages of which will be hereinafter set forth.

Figure 1:
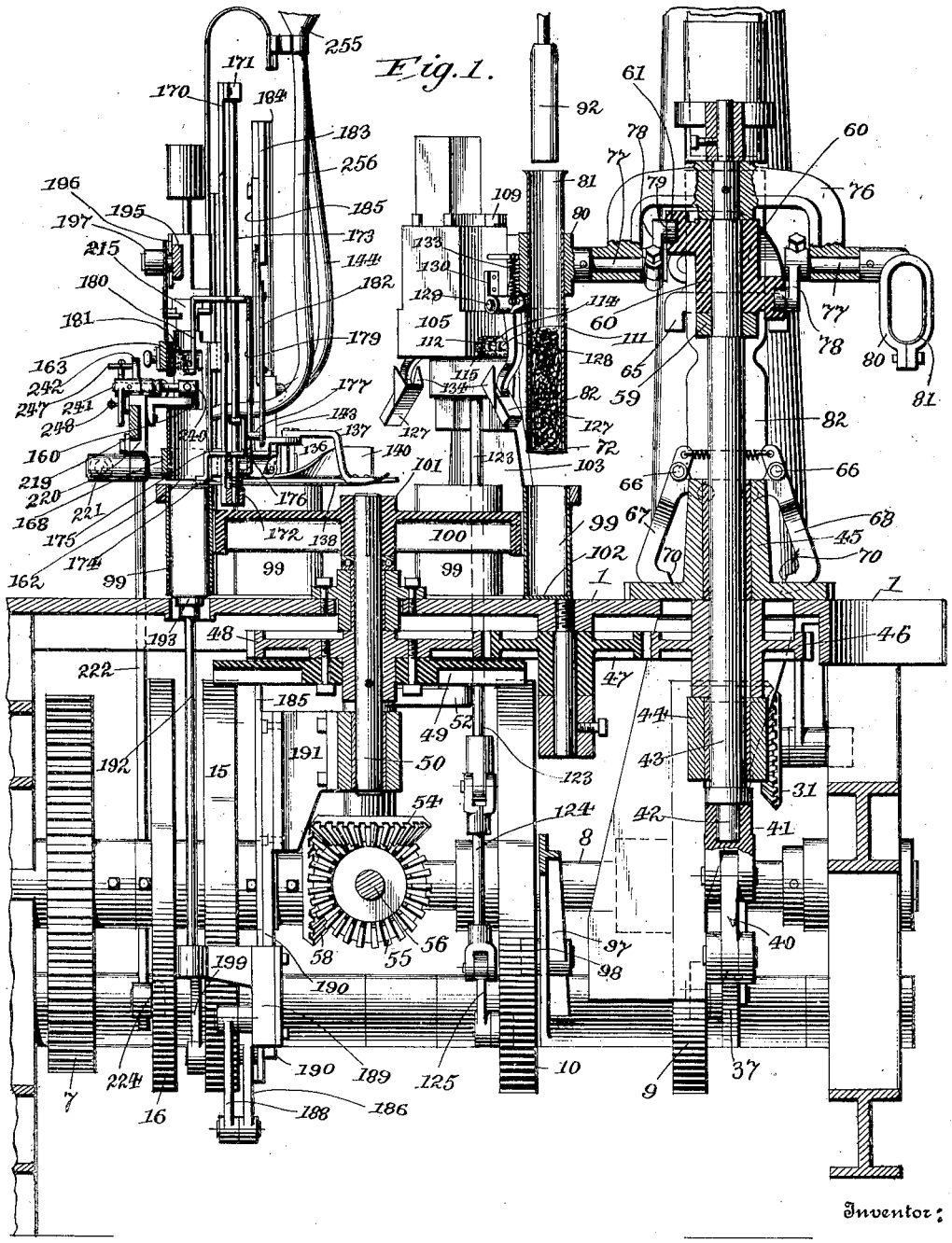
Figure 2:
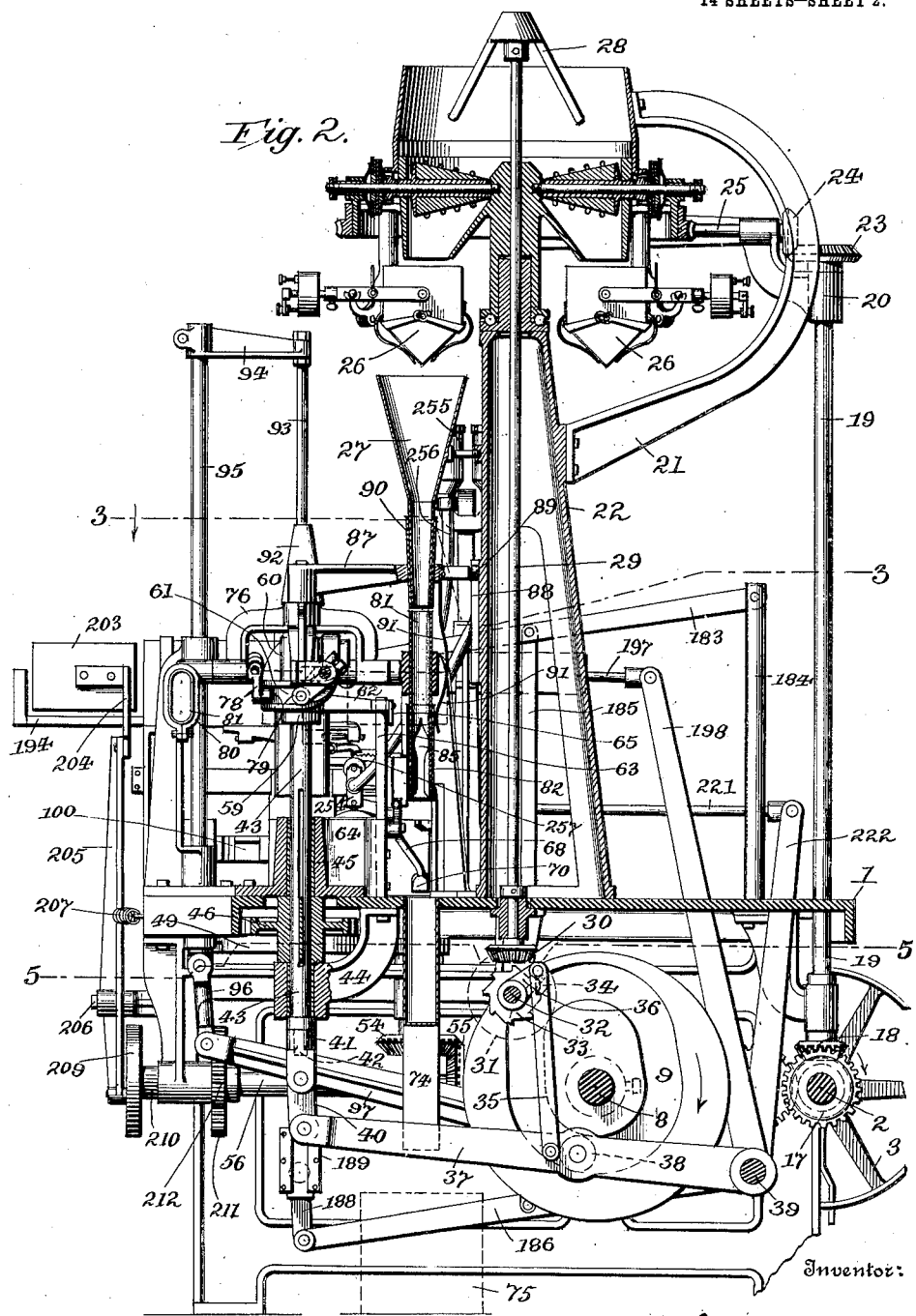
Figure 3:
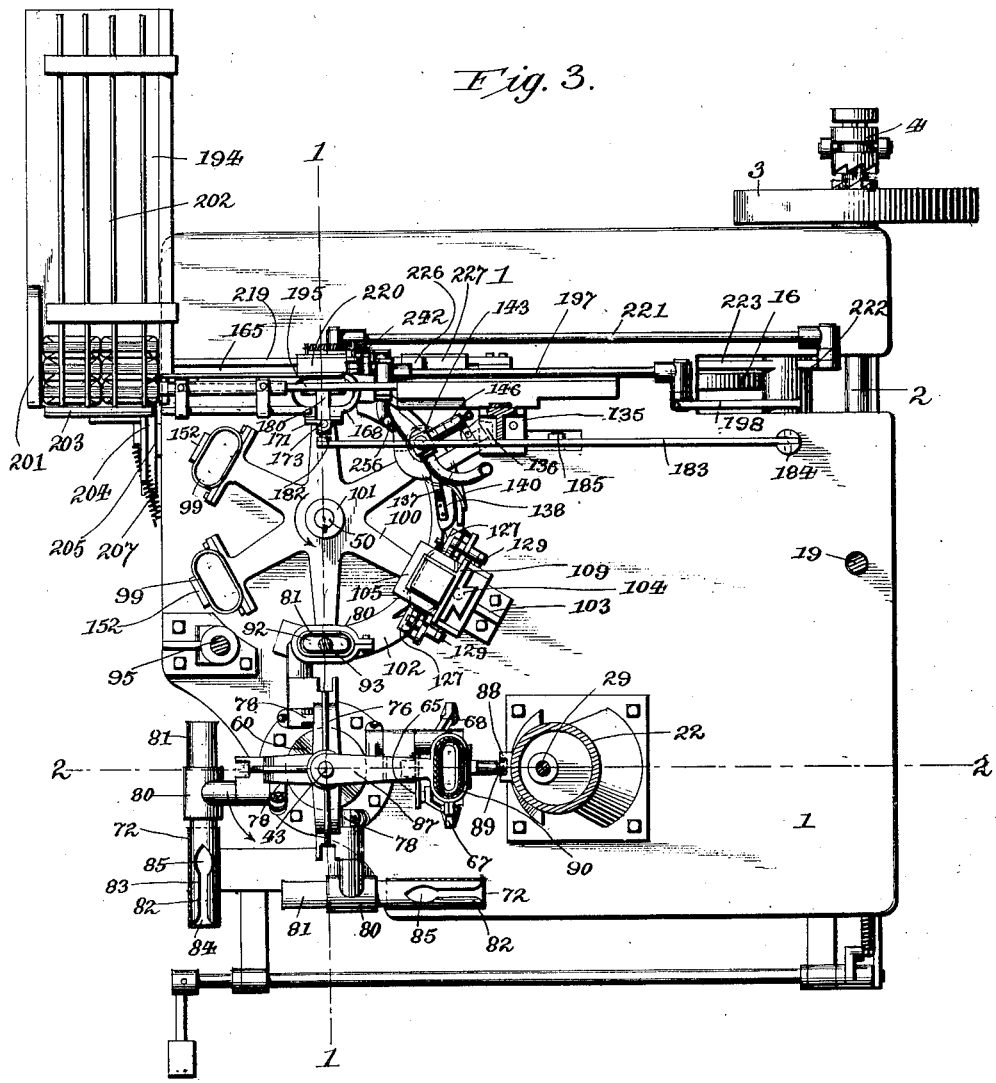
Figure 4:
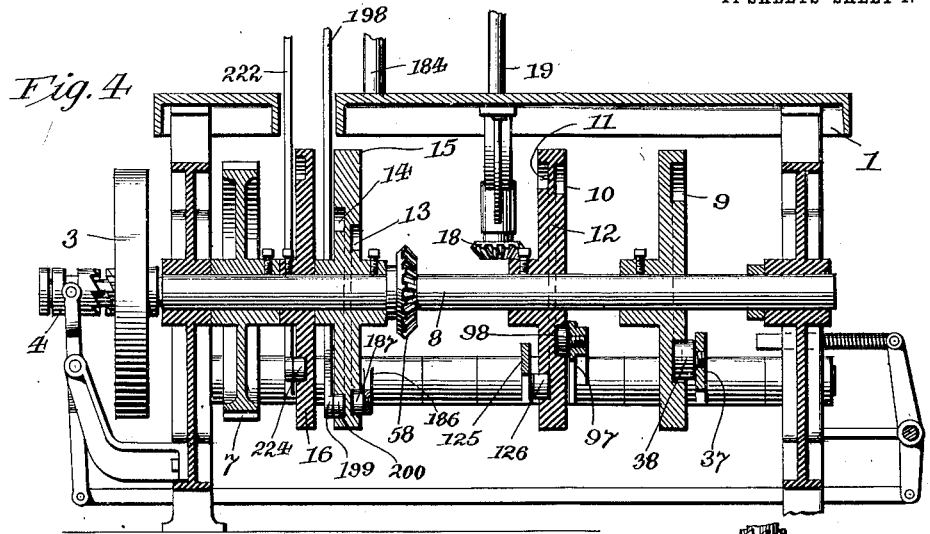
Figure 5:
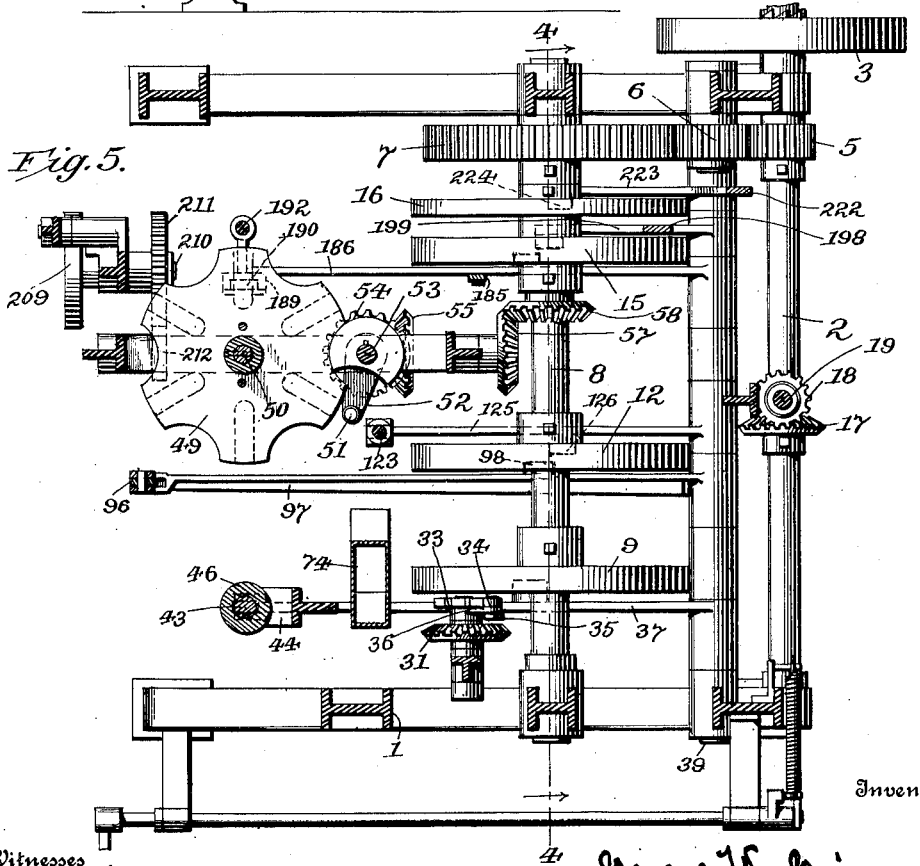

The machine in its preferred form is illustrated in the annexed drawings, wherein:
Figure 1 is a vertical sectional view of the machine, taken on the line 1—1 of Fig. 3, the weighing mechanism and certain other portions of the superstructure being omitted; Fig. 2 a vertical sectional view of the entire machine taken on the line 2—2 of Fig. 3; Fig. 3 a horizontal sectional view taken on the line 3—3 of Fig. 2; Fig. 4 a vertical sectional view taken on the line 4—4 of Fig. 5 and illustrating the main actuating cams; Fig. 5 a horizontal sectional view taken on the line 5—5 of Fig. 2, showing the cams, the levers operated thereby, and the Geneva movement employed to actuate the package-carrier; Fig. 6 a detail view of the bag-holder and the tucker or folder which acts upon the lower end of the bag; Fig. 7 a perspective view of the cam which positions the bag-holder, and the tucker just referred to; Fig. 8 a perspective view of one of the bag-holders, its supporting arm and actuating lever; Fig. 9 a perspective view of the nested bags, the outer one being broken away to disclose the inner impervious or waterproof bag, the bottom of the bag being shown in that shape or form which it assumes or has prior to being acted upon by the tucker; Fig. 10 a similar view showing the ends of the bottom as tucked or turned inwardly; Fig. 11 a vertical sectional view illustrating in detail the packer and the initial folding mechanism, and the cams which operate the same; Fig. 12 a vertical sectional view on the line 12—12 of Fig. 13, showing the coupon box or holder, the feeding mechanism therefor, and the initial side folders, the one on the right being shown in section; Fig. 13 a side elevation of said parts; Fig. 14 a perspective view of the coupon box or holder; Fig. 15 a sectional elevation of the coupon feeding mechanism showing the parts in position when the box has come to rest and the feed-rolls, with the withdrawn coupon, moved away from the box in the act of depositing a coupon in the bag or package below; Fig. 16 a horizontal sectional view on the line 16—16 of Fig. 13; Fig. 17 a view similar to Fig. 12, the parts, however, being lowered and the initial end folds having been made; Fig. 18 a side elevation of the paste or adhesive-applying mechanism which applies paste to the first inturned side flap; Fig. 19 a vertical sectional view of said mechanism; Fig. 20 a detail view illustrating the manner in which said mechanism is supported; Fig. 21 a perspective view of the means employed to hold down the initial inturned end folds, and the folding-blades or wings for turning down the side flaps; Fig. 22 a vertical sectional view of the parts just as the package is passing from beneath the last folding blade or wing; Fig. 23 a sectional elevation of the stamp-applying mechanism and its allied parts; Fig. 24 a vertical sectional view of the lower portion of the stamp-box, one pocket or chamber of the package-carrying turret and the mechanism employed to hold the stamp in position over the package and to fold or bend the same over the top and against the sides of the package as it is elevated preparatory to being transferred to the delivery table; Fig. 25 a side elevation of the stamp-positioning and applying mechanism, the parts being in the same relation as those shown in Fig. 24; Fig. 26 a vertical sectional view similar to that shown in Fig. 24, the parts being moved to the right, where the stamp-grasping jaws are brought into relation with the previously-protruded stamp; Fig. 27 a side elevation of the same parts, shown in the same relation; Fig. 28 a vertical sectional view, taken on the line 28—28 of Fig. 27, of the mechanism employed to apply paste to one flap of the package and also to the stamp; Fig. 29 a vertical sectional view taken on the line 29—29, of Fig. 27; Fig. 30 a vertical sectional view, taken on the line 30—30 of Fig. 29; Fig. 31 a perspective view of the stamp-grasping jaws and the mechanism employed to open the same after the stamp has been withdrawn and laid across the path of travel of the package; Fig. 32 a perspective view of the mechanism employed to elevate the package for the purpose of applying the stamp thereto and the parts employed to hold the last inturned flap in position and likewise retain the stamp in place upon the top of the package until the paste or cement employed in conjunction therewith has had time to dry and thus become securely attached to the package; Fig. 33 a side elevation of the cam employed to actuate the push-bar or arm which transfers the completed packages from the mechanism onto the delivery table; Fig. 34 a similar view of the cam employed to move or elevate the packages into operative relation to the stamp-applying mechanism and also to move the flap-holder which maintains the last inturned flap in its closed position; and Fig. 35 an end elevation of a section of the delivery table, the push-plate and the mechanism for operating the same, which plate moves the completed packages along the delivery table.

The main object of the present invention is to provide a simple and efficient mechanism whereby pulverulent material such, for instance, as scrap tobacco and the like may be automatically weighed, placed in a bag or like closure, a coupon, card or the like placed within the bag, the bag thereafter sealed, and a revenue stamp or the like applied to said closed bag which is automatically discharged from the machine.

It is conceivable, of course, that the package may or may not have a coupon or the like placed therein, and it is likewise conceivable that if the material being packaged does not require the presence of a revenue stamp said stamp may be omitted, or a label or like band placed thereon in lieu of the stamp.

A further object of the invention is to provide a simple and efficient holder for the bags, upon which they may be readily placed by an attendant, the construction being such that the operation of positioning the bags may be easily and readily effected, and this without the necessity of employing a skilled workman.

Another object of the invention is to provide a simple and efficient mechanism for feeding the coupons to the package.

A further object of the invention is to provide mechanism for tucking in the ears of the closed bag and also means for closing and sealing the normally open end of the bag.

A still further object of the invention is to provide an efficient stamp-applying mechanism in conjunction with which works a special means for holding the last inturned flap of the bag in its closed position and also means for holding the stamp which has just been applied to the up-turned end of the bag in place thereon until it has become securely attached thereto.

With these and other objects in view a detailed description of the invention will be given.

The machine herein set forth is especially designed and employed for the purpose of packaging scrap tobacco, though it is equally applicable for the packaging of other materials.

Referring to the drawings, 1 denotes the base or table beneath which is mounted a shaft 2 (see Fig. 5) upon which is loosely mounted a driving wheel 3, the shaft likewise having a clutch 4 (Fig. 4) splined thereon and adapted to coöperate with a clutch member carried by the wheel or pulley 3. A suitable treadle or like mechanism will be employed to throw the clutch into and out of operative relation with the driving wheel. A pinion 5 is secured to the shaft 2 and meshes with an idler 6, which in turn meshes with a large gear 7 secured to a cam-carrying shaft 8. Said shaft has secured to it a series of cams, a cam 9, which serves to raise and lower the shaft upon which the carrier or support for the bag-forms or holders is mounted; cams 10 and 11, formed on the opposite faces of a single casting 12, cam 10 serving to actuate the packer, and cam 11 to actuate the coupon feeding mechanism, and the initial folder; cams 13, 14, formed on the opposite faces of a single cam disk or member 15, cam 13 serving to actuate the package elevator or push member which removes the package from the form turret into operative relation with the stamp, and the cam 14 serving to actuate the push-bar which removes the completed and stamped package onto the delivery table; and a cam 16 which actuates the stamp-positioning mechanism.

Secured to the shaft 2 is a bevel gear 17 (Figs. 2 and 5) which meshes with a pinion 18 mounted upon the lower end of a vertically-disposed shaft 19, said shaft finding its support at its upper end in a bracket 20 which in turn is supported by one of a series of U-shaped arms 21 extending outwardly from a vertically-disposed post or column 22 mounted upon the bed or table 1. Said column and arms 21 form the support for the weighing mechanism, shown in section in Fig. 2, which mechanism *per se* is reserved for a separate application but is herein shown in order that the invention may be fully understood and claimed. Secured to the upper end of the shaft 19 is a bevel gear 23, which in turn meshes with a bevel pinion or gear 24 mounted upon the outer end of a shaft 25 which serves to rotate the weighing mechanism and to successively bring the scale-pans 26 thereof into proper position with relation to a funnel 27 through which the material is delivered into the bags or like containers.

A stirrer 28 (Fig. 2) works in conjunction with the weighing mechanism and serves to break up the material in order that it may be properly fed to the pans. Said stirrer is carried at the upper end of a vertically-disposed shaft 29 which extends upwardly through the column 22, the shaft at its lower end carrying a bevel pinion 30 which meshes with a similar pinion 31 (Fig. 5) which latter is carried upon a stub-axle 32, which axle likewise has secured to it a ratchet-wheel 33, with which coacts a pawl 34, pivotally mounted at the upper end of a link 35. Said link in turn is likewise pivotally connected to a rocker-arm 36, swiveled upon the stub-axle 32, and at its lower end to an arm 37 which carries a roller or bowl 38, working in conjunction with the cam 9. Through this mechanism an intermittent motion is imparted to the stirrer 28. The arm 37 is fulcrumed upon a fixed shaft or rod 39 which likewise forms the support for the various arms or levers which are actuated by the cams hereinbefore referred to. Said arm 37 at its outer or free end has pivotally connected to it a link 40 (Figs. 1 and 2) to which in turn is pivotally connected a block 41 provided in its upper end with a recess into which extends the reduced end of a stem 42 secured to or formed upon the lower end of a vertically-disposed shaft 43, which shaft supports the carrier upon which the bag-forms or holders are mounted. The shaft at its lower end finds its support in a bearing formed at the lower end of a bracket 44, a second support being provided in a collar or bearing 45 secured to the upper face of the bed or table 1. Intermediate said supports the shaft has splined to it a gear 46, the connection being such that the shaft may move through the hub of the gear as it is raised and lowered through the action of the arm 37 and the cam 9. Motion is imparted to the gear through an idler 47 which in turn meshes with a gear 48 secured to the upper face of the actuating and locking disk 49 of a Geneva movement secured to a shaft 50, which disk coöperates with a stud or roller 51 (Fig. 5) carried upon the outer end of an arm 52. Said arm is secured to a shaft 53 which also carries a bevel gear 54, meshing with a similar gear 55 secured upon a shaft 56 (Fig. 1), to the opposite end of which is secured a bevel gear 57, which meshes with a similar gear 58 carried by the shaft 8. It will thus be seen that through this gearing a step-by-step rotation will be imparted to the shaft 43 and also to the shaft 50, which latter carries the form-turret hereinafter referred to. It will likewise be noted that by reason of the proportioning of the gears 46, 47 and 48, as shown in Fig. 1, for every quarter revolution of the shaft 43 the form-turret will be given one-sixth of a revolution. Shaft 43, adjacent to its upper end, is reduced and provided with a washer 59, upon which rests a block 60, having a cam-race or way 61 formed therein, the cam being best illustrated in Fig. 7, upon an inspection of which figure it will be noted that the cam is provided with a straight run at the lower portion thereof and likewise with a straight run at a higher level, which straight sections are connected by an intermediate inclined section upon each side of the cam. This cam is held against rotation by an arm 62 which extends outwardly therefrom, the arm being provided at its outer end with a rectangular opening into which projects a post 63 secured at its lower end to a projection 64 extending outwardly from the collar or bearing 45. Any means may be employed, however, for securing the post in position.

To the outer end of the arm 62 is secured a U-shaped striker-plate 65, the downwardly-projecting fingers of which, as the shaft 43 is lowered, coact with rollers 66 mounted upon the upper short ends of the levers or arms 67, 68, which arms are fulcrumed upon pins or screws extending outwardly from the projection 64. A spring 69, secured to the upper ends of the arms 67, 68, tends normally to draw the inner ends of said arms together and to spread the lower ends, each of which is provided with an inwardly-projecting flat finger 70, which fingers, when drawn inwardly through the action of the striker-plate 65, tend to tuck or turn in the outwardly-projecting wings or flaps 71 of the lower closed end of the bag 72 from the position shown in Fig. 9 to that shown in Fig. 10. Said fingers, as will be noted upon reference to Figs. 6 and 7, stand over an opening 73 from which leads a chute 74, see Fig. 2, which chute discharges into a box 75. This chute is designed to receive any waste tobacco which may be accidentally discharged from the bag, or from the funnel 27 through one of the bag-holders, if perchance the bag should not be placed upon such holder.

Secured to the shaft 43 above the cam 61 is a spider frame provided with four outwardly and downwardly extending arms 76, said arms being alike in form and each provided at its lower end with a horizontally-disposed bearing for the short shaft 77, the shaft at its inner end having secured thereto an arm 78, the end of which is provided with a roller 79 that enters the cam groove 61. To the opposite end of the shaft 77 is secured a loop-shaped member or strap 80, which carries a bag-holder formed of spring sheet metal, and comprising a flattened tubular section 81 having at its lower end two spring arms 82 and 83 formed by slitting the opposite sides of the tubular member, as at 84, and forming an enlarged opening 85 at the upper end of the slit. By reason of this construction the arms 82 and 83 may be forced together by hand preparatory to slipping the bag thereover. In the present instance I have shown a waterproof bag or liner 86, which is placed within the bag 72, and these bags may be mounted upon the lower end of the bag-holder separately or preferably in a nested condition; that is to say the waterproof bag is placed within the other bag and the two then slipped on simultaneously.

On account of the form given to the cam 61, it will be seen that the bag-holders will lie in a substantially horizontal position or plane during one half the revolution of the shaft 43 and will maintain a vertical position during the remainder of the revolution. As will be seen upon reference to Fig. 3, the holders assume a horizontal position when they are moved adjacent to the outer edge of the table, in which position the operator will readily place the bags thereon.

Secured to the upper end of the shaft 43 is a horizontal arm 87, which extends to a point adjacent to the column 22, which column is provided with guides or ways 88 (Fig. 3) for the reception of a guide roller 89 secured upon the adjacent end of the arm 87. Said arm forms the support for the tubular member 90 (Fig. 2) which has a telescopic connection with the lower end of the fixed funnel 27. The lower end of the member 90 stands close to the upper end 81 of the bag-holder when said bag-holder is brought into the position shown in Fig. 2, at which time the parts are in position to receive a charge of material from the scale-pan 26, the material passing from the pan through the funnel, through the tubular member 90 and into the bag held by the spring arms 82 and 83. In order to prevent the bag from becoming disengaged from said arms 82 and 83, a spring 91 (Figs. 2 and 6) is secured to the arm 87 and extends downwardly and comes into contact with the outer face of the bag, which is then positioned beneath the funnel.

The cams are so timed that after the requisite quantity or charge of material has passed from the funnel through the tubular section 81 and into the bag, the shaft 43 is moved downward and as a consequence the tubular member 90 is moved downward together with the tubular section 81. As the shaft moves downwardly, the striker plate 65 is likewise moved and when the bag reaches a point adjacent to the fingers 70 which stand beneath the lower end of the bag, the plate will strike the rollers 66 and throw the lower ends of the arms 67 and 68 inwardly, thereby bending the flaps or wings 71 inwardly from the position shown in Fig. 9 to that shown in Fig. 10. The parts will then move upwardly, and after being moved upward the shaft is given a quarter revolution. This brings the charged bag, which is still retained upon the bag-holder, in alinement with a packer 92 (see Figs. 1, 2, 6 and 11), which packer is of a size to make a close fit with the tubular bag-holding section 81, the packer being carried upon the lower end of an arm 93 which is secured at its upper end to a bracket 94 attached to the upper end of a vertically reciprocating shaft 95. Said shaft has secured to its lower end, beneath the table, a link 96, which in turn is pivotally connected to the outer end of a lever 97, a roller 98 upon which coacts with the cam 10. The inner end of the lever 97 is fulcrumed upon the fixed shaft 39 heretofore referred to.

The cam 10 is so timed that it serves to lower the packer 92 into the bag-holder and its contained charge as the bag is lowered into one of the bag-forms or pockets 99 carried by arms 100 (Figs. 1 and 3) which arms extend outwardly from a hub 101 secured to the upper end of the shaft 50. When the bag and holder are fully lowered into one of the pockets 99 they come to rest upon a sector-shaped plate 102 (Figs. 1 and 3) which is secured to the upper face of the table and underlies those pockets which are in operative position with relation to the packer, and the folding or tucking mechanism hereinafter referred to. The plunger or packer 92 then descends and compresses the material in the bag-holder and by reason of the dwell formed in the cam 10 comes to rest. At this moment the shaft 43 begins its upward movement and as a consequence it draws the bag-holder from within the bag, the packer holding the material against endwise movement. The material is thus held until the bag-holder has entirely cleared the bag, at which moment the packer begins its upward movement and such movement continues until the parts come to the position shown in Fig. 11, at which time the bag with its compressed charge will be left in the bag-form or pocket 99. When the shaft 43 has reached its elevated position and the plunger 92 has cleared the bag-holder, and the bag-holder is clear of the bag, which has just been withdrawn therethrough, the shaft is given a quarter revolution which, of course, will bring another holder with a bag thereon into position beneath the funnel and likewise carry the bag which has just been filled to a position beneath the plunger, or to the position shown in Fig. 1. While this is being effected one-sixth of a revolution will be imparted to the wheel-like structure or turret upon which the bag-forms or pockets 99 are mounted, and in so moving the charged bag will be brought beneath the mechanism by which a coupon or the like is discharged into the bag and also beneath the devices which form the initial folds at the ends of the bag. This mechanism is best shown in Figs. 1 and 11 to 17 inclusive. Extending upward from the base or table 1 is a vertically-disposed post or column 103, shown in section in Fig. 16, and provided with a vertical way in its forward face into which extends a dovetail member 104 of a hollow rectangular slide 105. Said slide is adapted to receive a similarly shaped holder or container 106, shown in perspective in Fig. 14, in which coupons or the like, 107, are stacked. As will be seen upon reference to Figs. 14 and 15, the bottom of the holder is cut away, forming an opening 108 through which the lowermost coupon is exposed. Secured to the upper end of the holder or container is a cross-bar 109, which projects outwardly and rests, when the parts are fully elevated, upon the upper edge of the slide 105, and when partially lowered or in the position shown in Figs. 15 and 17, said bar comes into contact with fingers 110 secured to the post or column 103, the container being thereby arrested in its downward movement while the slide moves on independently thereof. In the lower end of the slide, and extending across the same in a horizontal direction, are two shafts 111 and 112, each being provided with a series of rubber rings 113 which, as will be seen upon reference to Fig. 16, are preferably staggered with relation to each other. The shaft 111 carries a gear 114 which meshes with a similar gear 115, mounted upon the shaft 112. Loosely mounted upon the opposite end of the shaft 112 is a gear 116 meshing with an idler 117, which in turn meshes with a rack 118 fixed to the column or post 103. Splined to the outwardly-extending hub of the gear 116 is a disk 119 to which is pivotally secured a pawl 120, normally held by a spring 121 in operative relation with a ratchet-wheel 122 pinned or otherwise secured to the shaft 112.

To the slide is secured a rod 123 which extends down to a point beneath the table (see Figs. 1 and 5) and is pivotally connected by a link 124 to the outer end of a lever 125, fulcrumed at its inner end upon the shaft 39. Said lever carries a roller or bowl 126 (Fig. 4) which coacts with the cam 11. These connections serve to raise and lower the slide 105 and to thereby actuate the shafts 111 and 112, which in effect are feed rollers, as the slide moves downward. By reason of the ratchet and pawl connection the rollers are idle when said slide is moved upwardly. When the parts are in their elevated position, or that shown in Figs. 12 and 13, the feed rolls will be in contact with the lowermost coupon in the container. Immediately the slide starts to move downward the rollers will be turned toward each other and by reason of the rubber rings 113 bearing against the lowermost coupon said coupon will be drawn in between the rollers and brought to the position shown in Fig. 15, at which time the container has come to rest upon the fingers 110, while the slide still continues its downward movement. The motion of the rollers will be comparatively rapid and each coupon thus withdrawn from the container will drop into the open-mouthed package, which at that moment stands immediately below the same.

By arresting the movement of the container and by having the rollers move quite rapidly, there is no danger of more than one coupon being withdrawn at a time, and furthermore by stopping the rotation of the rollers while they are moved upwardly and again come into contact with the lowermost coupon in the container, there is no danger of the coupons being torn, disrupted or thrown out of position in the container.

The slide 105 also carries the members which form two initial folds in the upstanding edge of the package. Each of said folders (of which there are two) is formed of a plate 127 pivotally connected to the lower end of a lever 128, fulcrumed at 129 upon a bracket or projection 130 extending outwardly from the side of the slide. The lever 128 at its upper end carries a roller 131, which, when the slide is moved downward, comes into contact with a fixed cam 132 secured to the post or column 103, thereby throwing the inner end of the lever inwardly against the action of a spring 133 which normally tends to throw the lower end of the lever outward or into the position shown in Fig. 12. The plate 127 is provided at each side adjacent to its inner end with an upstanding wing 134.

The folders are so weighted that they normally stand in the position shown in Fig. 12, in which position they leave a clear space for the passage of the coupon into the open mouth of the bag, the folders retaining this position until the rollers 131 come into contact with the fixed cams 132, at which time the inner ends of the levers are thrown inwardly and the plates come against the upstanding edge of the bag and serve to fold the remote portions of the sides inwardly. As the slide is further lowered, the plates contact with the upper face of the bag-form or pocket 99 and, by reason of the position of the walls of said member 99 with relation to the pivots of the plates, the latter will assume a horizontal position, as shown in Fig. 17, the wings 134 coacting with the plates to form the initial folds in the pocket. As the slide is moved upwardly, the folders will swing outwardly and tilt upwardly, thereby readily freeing themselves from the bag. This freedom of movement is also brought about by the fact that the wings 134 are spread outwardly toward their upper or free ends, as best shown in Fig. 13; in other words, the folders tend to throw the two remaining upstanding sides of the bag outwardly to a slight extent. These operations will take place while the turret or wheel-like structure which carries the bag-forms or pockets 99 is at rest.

After the slide and its allied parts have been moved upwardly, the turret is given a partial revolution, and such revolution carries the partially-closed bag into operative relation with the mechanism which folds down the two remaining upstanding sides or edges. This mechanism is best illustrated in Figs. 1, 3, 18 to 21 both inclusive and 28. Secured to and extending upwardly from the table is a column or post 135, which forms the support for the final folding mechanism, the paste-receptacle and the paste-applying mechanism by which paste or other adhesive is placed upon the third inturned fold or flap. Secured to a horizontally-projecting portion 136 of the column 135 is an arm 137 which carries at its outer end the forward end of a flap-retaining plate 138, said plate lying in the path of rotation of the pockets 99 and extending from one pocket to another, as will be readily seen upon reference to Fig. 21. This plate is thin but is sufficiently rigid to hold the first pair of inturned flaps in their inturned position, and comes into contact with said flaps formed by the folders just described as the turret moves from beneath said folders into position where the remaining flaps are to be turned down and secured.

Attached to a block 139, which in turn is fastened to the member 136, is a plate 140, the forward edge of which stands in a substantially vertical plane, the plate being then gradually turned or twisted throughout its length until it assumes a horizontal position. Said plate engages the upstanding flap, designated by 141, and turns the same down over the retaining plate 138. At its rear or horizontal portion the plate 140 is cut away to permit a feed-roller 142 to come into contact with the upper face of the inturned flap 141 to apply paste or other adhesive thereto. Said roller is mounted in the lower end of a receptacle 143 into which extends a pipe or conduit 144, which is connected at its upper end to a suitable can or reservoir containing the main paste supply. The receptacle 143 is provided with a hollow, laterally-extending boss which fits over a pin 145 projecting outwardly from one side of a U-shaped frame 146, which is pivoted at 147 to the post or column 135. A spring 148 serves to hold the frame in its elevated position and a stop screw 149 mounted in the member 136, prevents too great an upward movement of the frame under the action of the spring. To the lower free end of said U-shaped frame 146 is secured a block 150 which carries a roller 151 adapted to coact with a cam 152 secured upon the outer face of the bag-holder or form 99. Said block 150 is connected to the frame 146 by a rod or stem 153 which passes through the laterally-projecting free end of the U-shaped frame 146, a spring 154 encircling the stem 153 and acting at its upper end against a collar 155 secured to the stem. By reason of the fact that the lower end of the spring rests upon the upper face of a laterally-projecting arm of the frame 146 and its upper end against the collar, the block 150 will normally be held close against the lower face of the U-shaped frame and will not yield unless some extraneous material come between the roller 142 and the inturned flap 141 of the package, or unless the flap itself be de-formed. The cam 152 normally draws the paste-roller down into contact with the flap when the package is moving beneath the same, but the construction just referred to permits the members to yield if this become necessary. After the paste has been applied to the outer face of the third or inturned flap 141, which flap is still retained in its closed position by the rearwardly-extending wing of the folder plate 140, the remaining upstanding flap 156 comes into contact with the upstanding or vertical edge of the final folding plate 157, which is supported upon the outer end of the member 136. Said plate 157 gradually passes from a vertical to a horizontal position and serves to force the flap 156 against the pasted, inturned upper face of the flap 141, thereby sealing the package. It is to be noted that the retaining plate 138 during this operation underlies the flaps 141 and 156 and consequently the flap 141 is rigidly supported while the paste is being applied thereto, and furthermore, the inturned flaps 141 and 156 are held between the two plates while the paste or other adhesive is drying. After the flaps are thus secured, by moving the turret or bag-form-carrying member to the position shown in Fig. 24, the sealed package is brought beneath the tubular member or package-guide 158 (see Figs. 23 to 27 inclusive). Said member, as will be seen upon reference more particularly to Figs. 24 and 26, is slightly flared at its lower end, in order to facilitate the entrance of the package into the same, and is likewise provided with a vertically-disposed slot 159 extending from the top to the bottom thereof at its inner side. The forward face thereof is likewise cut away to permit the passage of the stamp-positioning mechanism therethrough. By cutting away the forward face and sides of said member horizontally-disposed edges or ledges 160 are formed, upon which the stamp 161 comes to rest when drawn through the member by the stamp-positioning mechanism. The lower edge of the upper portion of said tubular member, designated by 162 (Figs. 24 and 26), is flared so as to permit the free passage therethrough of the package together with the stamp, in a manner which will be presently set forth.

The tubular member is supported by a bracket or casting 163 which in turn is secured to the lower wall 164 of the tunnel or runway 165 through which the finished packages are discharged. Said member 163 is provided with downwardly-extending lugs 166 in each of which is adjustably mounted a brush 167, the ends of which extend into the openings in the tubular member 158 and serve, as the package and stamp are elevated, to press the ends of the stamp against the sides of the package. Said tubular member or package-guide 158 is provided at its lower end with a bracket 168, to which are secured two vertically-disposed bars 169, 170, said bars standing adjacent to the slot 159 and extending upwardly to a point above the tunnel 165, said bars being likewise secured to the casting 163, see Fig. 1. The upper ends of said bars are connected by a cross-piece or casting 171, see Fig. 32, and a similar casting or cross-piece 172 is secured to the lower ends of said bars. A fixed guide rod 173, best shown in Fig. 32, is supported by and between said members 171 and 172, and a flap-presser and retainer and stamp-presser and retainer are mounted upon said rod and move up and down thereon.

The flap-presser and retainer comprises a plate 174 which, as will be seen upon reference to Fig. 32, bears directly upon the uppermost flap 156, but does not entirely cover the same, leaving sufficient room for the stamp to be drawn across the upper edge of the package and to be properly positioned upon the middle section thereof. Said plate is secured to an L-shaped arm 175 formed as an integral portion of a slide 176 which encircles the rod 173. A lug or arm 177 extends outwardly from said slide, passing through a slot or opening 178 formed in the upright portion of a slide 179 which forms the support for an L-shaped arm 180 which carries the stamp-presser plate 181, said lug being connected to the lower end of an adjustable link 182. The upper end of said link in turn is connected to one end of a lever 183, fulcrumed at its other end upon a fixed post or column 184 extending upwardly from the bed or table. A rod 185, pivotally connected to the lever 183 about its mid-length is likewise pivotally connected at its lower end to a lever 186 which is fulcrumed upon the shaft 39 hereinbefore referred to. Said lever is provided with a roller 187 which coacts with the cam 13. To the outer end of lever 186 is pivotally connected a link 188 which in turn is pivotally connected to a slide 189 mounted upon a guide bar 190 (Figs. 1, 23 and 32) which is secured to and supported by a bracket 191 located beneath the bed or table. The slide 189 is provided with a vertically extending rod 192 carrying at its upper end a push-plate 193 of a size to pass freely into the lower end of the pocket 99 and to come into contact with the under face of the package and move the same endwise therefrom into and through the tubular member or package-guide 158. Through the connections above described, between the levers 183 and 186, it will be noted that the flap-retainer plate 174 and the push-plate 193 move substantially in unison, and as the package is moved upwardly out of the pocket 99 the inturned flap 156 will be held by the flap-retainer plate 174.

Normally the stamp-presser plate 181 lies just below the plane in which the brushes 167 are mounted, and consequently said plate does not come into action until after the stamp has been positioned with reference to the upwardly-moving package and comes to rest upon the top thereof. Almost immediately the stamp is positioned upon the package the plate 181 comes into action and serves to hold the stamp closely upon the upper end of the package and maintain it in this position against the action of the brushes, which tend to wipe the face of the stamp down against the sides of the package. By employing the plate 181 the stamp is firmly pressed in place and furthermore any tendency of one brush to draw the stamp endwise, owing to its greater stiffness or to the fact that the brushes are not evenly adjusted, is overcome.

The plates 174 and 181 retain their position upon the flap and the stamp, respectively, until such time as the package has reached its highest point or elevation and stands in line with the mouth of the tunnel or runway 165, through which the packages are moved onto a delivery table 194. This movement of the packages is effected by a push-bar 195, the rear end of which works in a suitable way or guide 196 (see more particularly Fig. 23) the bar being actuated by a rod 197 pivotally connected thereto, which rod in turn is pivotally connected to the upper end of an arm 198 of an elbow lever fulcrumed upon the shaft 39, the short arm 199 of which lever in turn carries a roller 200 which works in conjunction with the cam 14. The cam is, of course, so timed with reference to the cam 13 that the push-bar 195 does not come into operation until after the package has been moved upwardly to the full extent and there comes to rest.

The delivery table 194 is best shown in Figs. 2, 23 and 35. It is provided with an upstanding wall 201 at its outer edge, in line with the push-bar 195, and also with a series of retaining bars or wires 202, which are located above the table at the height of a package, so that the packages are moved upon the table beneath said wires which overlie the upper ends of the packages and rest directly thereon, thus serving to hold the stamps in position.

Located at the upper end of the table is a push-plate or bunter 203, secured to the free end of a U-shaped member 204, the opposite end of said member being secured to the upper end of a lever 205, fulcrumed at 206 and normally drawn away from the table by a spring 207. The lower end of the lever carries a roller 208 which functions with a cam 209 mounted upon a shaft 210, which shaft likewise carries a gear 211 (see Figs. 2 and 5), the gear meshing with a pinion 212 (Figs. 2 and 35), which latter is mounted upon the shaft 56 hereinbefore referred to, and which receives its motion through the gears 57 and 58 from the main cam-carrying shaft 8.

The bunter or push-plate 203 comes into action only after two packages have been positioned upon the table by the push-bar 195 and pushes said two packages along upon the table beneath the bars 202 a distance equal to the thickness of one package. It is then withdrawn and leaves a space into which two additional packages may be inserted by the push-bar 195.

*Stamp-presenting mechanism.*—This mechanism is best shown in Figs. 1, 3 and 26 to 31 both inclusive. Secured to the table and extending upwardly therefrom are two columns or standards 135 and 214 (see Fig. 23), the former providing a support for the guide-way 196 heretofore referred to, and the latter forming a partial support for the table and the runway 165. Suspended from the under side of the guide-way 196 is a stamp-box 215, the lower edge of which is slitted and the forward end, at the lower portion thereof, provided with an opening 216 through which the stamps 161 may be projected and withdrawn. A weighted presser-plate 217 rests upon the pile of stamps and serves to hold the same within the box. The stamps are retained therein by a pointed blade 218, which is so adjusted that it will protrude through the lowermost stamp in the box and thus prevent the withdrawal of more than one stamp at a time.

Secured to and extending from the column 135 to the column 214 is a fixed bar or slide-way 219, upon which is mounted a reciprocating carriage 220, which carries the stamp-grasping and positioning jaws, the bunter which actuates the stamp-protruding device, the cams that position the paste-roll with reference to the stamp and the stamp-withdrawing mechanism. The slide or carriage is connected by a rod 221 to the upper end of the long arm 222 of an elbow-lever fulcrumed upon the shaft 39. The short arm 223 of said lever carries a roller 224, which works in conjunction with the cam 16. As the cam rotates the carriage 220 is moved back and forth along the slide-way from a point adjacent to one end of the stamp-box through the lateral opening in the package-guide 158 and to a point beyond the same, depositing the stamp upon the ledges 160 heretofore referred to.

Secured to the carriage and extending outwardly therefrom to one side of the stamp-box is a rack-bar 225, which bar works through an upward extension 226 formed upon a secondary slide or carriage 227, which is also mounted upon the bar 219. To the outer end of the rack-bar is secured a collar 228, which in turn carries an adjustable bunter-pin or screw 229, adapted to coact with the finger which protrudes the lowermost stamp from the box.

Extending laterally from the slide 227 (see Fig. 29) is a pivot-screw or pin 230, upon which is mounted a rocker-arm or elbow-lever 231, provided with a lateral extension or finger 232 which normally stands in the path of the bunter-screw 229. An arm 233 is pivoted upon the pin 230 and is provided with a laterally-extending lug 234, against which bears a screw 235, adjustably secured to the lower end of the rocker-arm 231. To the upper end of the arm 233 is pivoted a block 236, the upper face of which is provided with a rubber shoe 237 which stands in alinement with a slot formed in the lower face of the stamp-containing box 215, and when the parts are in the positions shown in Fig. 26 this rubber shoe is drawn up into contact with the lowermost stamp and serves to protrude the stamp as the shoe and the parts which support it are moved to the right with the slide 227. The slide is free of any connection with the actuating parts and is moved to the right when the bunter-screw 229 comes into contact with the finger 232 which serves to rock the elbow-lever 231 and its allied parts to throw the shoe into contact with the stamp and to thereafter move the slide to the right.

The slide is moved to the left (at which time the bunter-screw 229 is withdrawn from contact with the finger 232) by a push finger 238 (see Fig. 24), which finger is attached to the carriage 220, as best illustrated in Fig. 27. This finger comes into contact with the laterally-projecting finger 232 when the carriage nears the limit of its movement to the left and thereby moves the slide to the left, or to the position shown in Figs. 24 and 25.

The carriage 220 supports the stamp-grasping jaws 239 and 240, the lower jaw (239) being fixed and lying in a substantially horizontal position, while the upper jaw (240) is movable, being mounted upon one end of a rocker-shaft 241, which finds its bearing in the carriage 220. To the opposite end of said shaft 241 is secured an arm 242, said arm being provided at a point above the shaft with a forwardly-extending lug 243 adapted to coact with a squared face 244 of a latch member which takes the form of a pivoted bar 245. A spring 246 is connected to the upper end of the bar 245, and a pin 247, extending outwardly from the arm 242, serves to throw said arm and the bar toward each other and to cause the latch member 243 to pass over and onto the face 244. A spring 248 is secured to the lower end of the arm 242, the opposite end of the spring being secured to the carriage and serving to rock said arm so as to throw the latch member 243 into operative relation with the face or shoulder 244. Mounted upon the slide 219 are two adjustable stops 249 and 250, which coact with the bar 245 and the arm 242, respectively.

When the parts are in the positions shown in Fig. 27, the lower end of the arm 242 comes into contact with the stop 250 and as a consequence is rocked, the upper end being thrown to the right, and the jaw 240 elevated, the spring 248 at such time being placed under stress. This will separate the jaws and the stamp (which has been previously grasped) will be released. Simultaneously with the opening of the jaws and the release of the stamp, the spring 246 will rock the bar 245, permitting the squared shoulder 244 to pass under the latch member 243, thereby locking the jaws in their open position. As the carriage is moved to the left the parts will remain in this position, and the jaws will pass over into engaging position with reference to the stamp 161, which has just been protruded through the opening 216 in the stamp-box. When the parts come to this position, the lower end of the pivoted latch bar 245 will come into contact with the stop 249 and withdraw the shoulder 244 from beneath the latching member 243. The spring 248 will then rock the arm 242 and as a consequence will rock the shaft to which it is attached, and throw the upper jaw 240 downwardly toward the fixed jaw 239, thereby grasping the protruded end of the stamp. The cam 16 will then move the carriage, through the connections before described, to the right, and the stamp, which has just been grasped, will be withdrawn from the box and placed over and through the opening in the package-guide, coming to rest upon the ledges 160 directly in line with the package, which will then be moved upwardly against the stamp.

In order to apply the necessary paste or other adhesive to the under face of the stamp the following mechanism is employed: Pivotally secured to the column or standard 135 is a lever 251, to the outer end of which is attached a spring 252 (Figs. 23 and 28), the inner end of said lever carrying a cross-pin 253, best shown in Fig. 28. Upon the inner end of said pin is mounted a paste receptacle or box 254 which is in communication with a main paste supply receptacle 255, through a tube 256. In the upper portion of the box is mounted a roller 257, the supporting shaft of which is extended outwardly from the box and carries a star-wheel 258 adapted, as the carriage is moved to the right, to mesh with the rack 225 and to be thereby rotated. At the same time that it is rotated the spring 252 comes into action and serves to elevate the paste-box and the roller and to carry the same into direct contact with the stamp, one end of which is held by the jaws, while the body is being gradually withdrawn through the opening 216.

As the carriage nears its limit of movement to the right, it is desirable that the star-wheel or pinion 258 should be withdrawn from operative relation with the rack-bar 225. To effect this object a cam 259 is secured to the slide 227 (Fig. 25), said cam riding over a roller 260 secured to the outer end of the pin 253, carried by the lever 251. This cam will hold the paste-receptacle in a position where the rack will be out of engagement with the pinion, and inasmuch as the slide 227 remains at rest until the finger 238, carried by the carriage 220, contacts with the finger 232, the paste receptacle will remain in its partially lowered position. Secured to the carriage 220 is a second cam 261, which is somewhat deeper than the cam 259, and said cam comes into operation as the cam 259 is moved out of contact with the roller 260. The cam 261 further depresses the paste-receptacle and draws the same downward to such an extent that the jaws may pass over it and grasp the end of the stamp which has been protruded from the stamp-box. It will be understood, of course, that the slide 227 is at such time moved to its extreme left-hand position and immediately the carriage begins to move to the right the cam 261 will move out of contact with the roller 260 and permit the spring 252 to rock the lever 251 and thereby draw the paste-roller directly up into contact with the stamp, which position will be maintained until the stamp reaches its limit of movement and the cam 259 again functions with the roller 260. The free end of the stamp will drop down over the roller and sufficient adhesive will be applied thereto, and while no adhesive can be applied to the protruded end of the stamp the brushes 167 will, as the package is passed up through the package-guide 158, force enough adhesive downward along the under face of the stamp to secure said ends.

It is thought that from the foregoing description the operation of the apparatus will be readily understood. It may be mentioned, however, that by reason of the fact that the bag-form is brought up to the horizontal position the bags may be readily placed thereon. It is also to be noted in this connection that the holders always remain attached to the carrier, and that there are no movable parts other than the axle or shaft upon which the holder is supported and the attendant mechanism for rocking said shaft. It is likewise to be noted that each package is moved directly by the mechanism and that the packages are not brought into contact with each other except where they pass through the runway or tunnel leading to the delivery table, at which point they simply come in contact at their sides, which, however, tends to hold the ends of the stamps in place until they are thoroughly dried. Consequently, no de-formation takes place at the ends of the packages. It is also to be noted that the folding mechanism for folding in the upstanding edges of the top of the bags contains but few movable parts, these, in fact, being only in the initial folding mechanism. Again, the mechanism which is employed to hold the last downwardly-turned flap in position while the stamp is being applied thereto is found in practice to be highly efficient, and by means of this mechanism taken in conjunction with the plate which holds the stamp in position, the sealed end of the package is held tightly and the adhesive becomes set before the package is finally removed from the machine.

As before noted, the weighing mechanism shown in Fig. 2 is reserved for a separate application, but is shown in conjunction with the other mechanism in order to fully disclose an operative machine.

In the following claims, where the term "bag" is employed it is to be understood as being the equivalent of any other form of container capable of use in conjunction with the machine, except in those claims where, by reason of certain features, the presence of a bag is absolutely essential.

No claim is herein made to the coupon-feeding mechanism, that being reserved for a divisional application to be filed in view of the requirements of the Patent Office.

Having thus described my invention, what I claim is:

1. In a packaging machine, the combination of a tubular bag-holder; means for supporting the same; means for mechanically oscillating or rocking said holder back and forth; and means for forcing the material into the holder, whereby it will be brought from a vertical to a horizontal position for the reception of a bag and thereafter returned to the vertical position in order that the material to be packaged may be placed within the same.

2. In a packaging machine, the combination of a tubular bag-holding member; a supporting member extending outwardly from said holder at right angles to the longitudinal axis thereof, said supporting member lying in a substantially horizontal plane; means for rocking said supporting member back and forth, whereby the holder may be carried into and out of horizontal position; means for introducing a charge of material into the bag carried by the bag-holding member when in its vertical position; and means for compressing the charge while the holder is thus positioned.

3. In a packaging machine, the combination of a tubular bag-holder adapted to receive and support a bag upon its outer face and to receive within it a charge of material; a shaft extending outwardly from the holder; a rocker-arm mounted upon the shaft; and a fixed cam coacting with said rocker-arm and adapted to oscillate the holder from a horizontal to a vertical position and vice versa, whereby the holder will be brought to position where a bag may be readily placed thereon and then turned upright to receive a charge of material within the same.

4. In a packaging machine, the combination of a frame provided with a series of supporting members; a rotatable shaft to which said members are secured; a plurality of tubular bag-holders, each adapted to receive and support a bag upon its other face and to receive within it a charge of material; a shaft secured to each holder and having its bearing in one of said supporting members; and a fixed cam for oscillating said bag-holders to carry them from a vertical to a horizontal and from a horizontal to a vertical position, whereby the holder when in a horizontal position may have a bag readily placed thereon and then turned upright to receive a charge of material.

5. In a packaging machine, the combination of a rotatable shaft; a supporting member carried thereby and rotatable therewith; a plurality of tubular open-ended bag-holders mounted upon said supporting member, each of said holders being adapted to receive upon its outer surface a bag and within the same a charge of material; a supporting shaft for each bag-holder; and a cam acting to hold the bag-holders in a vertical position during approximately one half of the revolution of the rotatable shaft aforesaid, and in a horizontal position during the remainder of the revolution of the shaft, whereby when a holder is in a horizontal position a bag may be readily placed thereon and a charge of material received within the holder when the same is turned to its vertical position.

6. In a packaging machine, the combination of a rotatable shaft; a supporting member secured thereto; a plurality of tubular open-ended bag-holders carried by said supporting member and each adapted to receive upon its outer face a bag to be charged with material; a non-rotatable cam; connections between said cam and each of said bag-holders, whereby said holders will be successively brought from a vertical to a horizontal position during a part of the revolution of the shaft, and then from a horizontal to a vertical position during the remainder of the revolution of the shaft; and means for feeding material to the holders while in a vertical position.

7. In a packaging machine, the combination of a rotatable and endwise-movable shaft; a supporting member secured to the shaft and movable therewith; a plurality of bag-holders mounted upon said supporting member; means for oscillating said bag-holders to bring them from a vertical to a horizontal and from a horizontal to a vertical position; and means coöperating with the bag-holders to turn the flaps upon the lower ends of the bags as the shaft is lowered.

8. In a packaging machine, the combination of a bag-holder adapted to hold a bag thereon in its distended position, with the completely closed end of the bag underlying one end of the holder and the flaps or wings on the closed end of the bag extending outwardly therefrom; means for raising and lowering said holder; and mechanism actuated by said raising and lowering means for inturning the projecting flaps or wings upon the lower closed end of the bag.

9. In a packaging machine, the combination of a bag-holder adapted to hold a bag thereon in its distended position with the completely closed end of the bag underlying one end of the holder, the wings on the closed end of the bag extending outwardly therefrom; means for raising and lowering the holder; a pair of levers, each lever being provided at one end with a finger, said fingers being adapted, when thrown inwardly, to contact with the wings on the bag and to turn the same inwardly beneath the closed bottom of the bag; and means coacting with said levers to cause the same to function as the bag-holder is lowered toward said fingers.

10. In a packaging machine, the combination of a rotatable and longitudinally-movable shaft; a supporting member carried thereby; a plurality of bag-holders carried by said member; means for oscillating said bag-holders from a vertical to a horizontal and from a horizontal to a vertical position; a pair of vertically-disposed levers arranged in the path of movement of the bag-holders, as said holders are moved, and adapted to coact with one of the bags as its holder is lowered; fingers carried upon the lower ends of said levers; and means actuated by the shaft as the same is moved downwardly to cause said levers to swing so as to carry the fingers thereof inwardly beneath the bags, whereby the wings or flaps at the lower ends of the bags will be turned inwardly beneath the bottom of the same.

11. In a packaging machine, the combination of a rotatable and longitudinally-movable shaft; a supporting member carried thereby; a plurality of bag-holders mounted upon said supporting member; a cam coöperating with said holders to throw them from a vertical to a horizontal and from a horizontal to a vertical position; a pair of vertically-disposed levers fulcrumed upon a fixed portion of the machine; a flattened finger extending inwardly from the lower end of each of said levers; means for spreading said fingers apart; an arm extending outwardly from the shaft and movable up and down therewith; and a striker-plate carried upon the outer end of the arm and adapted to coact with the levers to throw the fingers inwardly as the shaft and the supporting member, and consequently one of the bag-holders with a bag thereon, is carried downwardly into the path of movement of said fingers, whereby the outwardly-extending flaps or wings at the lower ends of the bags will be turned inwardly beneath the bottom thereof.

12. In a packaging machine, the combination of a rotatable, longitudinally-movable shaft; a plurality of bag-holders carried thereby; means for rocking said bag-holders from a vertical to a horizontal and from a horizontal to a vertical position, whereby the bags may be readily placed upon said holders and the holders, with the bags thereon, thereafter moved to a vertical position; means for turning in the flaps or wings upon the lower end of the bag after the same has been placed upon the holder; means for discharging a measured quantity of material into the holder with the bag thereon; means for compressing the charge and withdrawing the holder from the bag; means for placing a coupon in the open mouth of the bag; and means for closing and sealing the open end of the bag.

13. In a packaging machine, the combination of a rotatable and vertically movable shaft; a plurality of bag-holders carried thereby; means for rocking said holders about their supports to bring them from a vertical to a horizontal and from a horizontal to a vertical position; means for feeding a charge of material to a holder and the bag thereon while said holder is in a vertical position; means for compressing the charge and simultaneously withdrawing the holder from within the bag; means for feeding a coupon into the open mouth of the bag and thereafter inturning the oppositely-disposed edges of the upstanding end; and means for folding in the upstanding flaps and sealing the same.

14. In a packaging machine, the combination of means for holding a bag in a distended position; means for charging the bag; means for compressing the charge and withdrawing the distending means from the bag; a slide located in line with the mouth of the open bag; a pair of feed rolls mounted upon said slide; a box for holding coupons or the like, coöperating with said rolls; a pair of folders likewise carried by the slide and adapted, when the coupon has been fed into the open-ended package, to form the initial folds in the upstanding end thereof; and means for turning in the upstanding flaps at the upper end of the bag.

15. In a packaging machine, the combination of means for holding a filled bag with its open end uppermost; a slide; a pair of vertically and oppositely-disposed levers fulcrumed upon said slide; means for normally drawing the lower ends of said levers outwardly; a folding plate pivotally mounted upon the lower end of each of said levers; and means for throwing the lower ends of said levers inwardly as the slide nears the limit of its downward movement, whereby the folding plates will be carried inward and then downward, thereby forming the oppositely-disposed initial folds in the upstanding end of the bag.

16. In a packaging machine, the combination of a vertically-disposed bag-form adapted to receive and hold a filled bag, the mouth of which is open; a slide above said bag-form and movable toward and from the same; a pair of levers fulcrumed upon oppositely-disposed sides of said slide; a folding plate flexibly mounted upon the lower end of each of said levers, the plates being so arranged that they normally stand in an approximately vertical position; folding wings carried upon opposite sides of the inner ends of each of said plates; means for normally throwing the lower ends of said levers outwardly; and fixed cams coöperating with said levers and serving, as the slide is moved downward and approaches the upstanding end of the bag, to throw the ends of said levers inwardly and thereby bring the plates in contact with the upper end of the bag-form, whereby said plates will be rocked and the inner ends thereof thrown downwardly, thus forming the initial oppositely-disposed folds in the upstanding end of the bag.

17. In a packaging machine, the combination of means for forming the oppositely-disposed initial folds in the upstanding end of a filled bag; a plate adapted to overlie said infolded portions; a second curved plate adapted to engage one of the upstanding flaps of the bag and to hold the same down upon the plate; means for applying adhesive to the upper face of said inturned flap; and means for folding the remaining upstanding flap down upon said flap to which the adhesive has just been applied.

18. In a packaging machine, the combination of a rotary member provided with a plurality of bag-forms, each adapted to hold a filled bag, means for forming oppositely-disposed initial folds in the upstanding end of the filled bag; means for moving said rotary member; a plate adapted to overlie the initial folds, said plate coming into contact therewith as the member is rotated; means for folding down one of the upstanding flaps of the bag; a paste-applying roll standing in alinement with the last inturned flap; means actuated by the rotary member to draw said roll down upon said flap as it passes beneath the same; and means for turning the last upstanding flap down upon the flap to which adhesive has just been applied.

19. In a packaging machine, the combination of a rotary member provided with a plurality of pockets or bag-forms, each adapted to support or hold a filled bag; means for forming oppositely-disposed initial folds in the upstanding end of the bag; means for folding down one of the upstanding flaps; a paste-roll; means for normally holding said roll out of alinement with said last inturned flap; means carried by the form in which a bag is located coacting with the paste-roll to draw the same downward into contact with the upper face of the last inturned flap; and means for folding down said last upstanding flap into contact with the face of the previously inturned flap to which adhesive has been applied.

20. In a packaging machine, the combination of a rotary member provided with a plurality of pockets, each adapted to hold a filled bag; means for forming oppositely-disposed initial folds in the upstanding end of the bag; means for inturning the third upstanding flap of the bag; a paste-applying mechanism standing in the path of travel of said inturned flap; means for normally holding said paste-applying mechanism in its elevated position; a cam mounted upon the pocket; a yielding member extending downward from the paste-applying mechanism and adapted to coact with the cam, whereby the paste-roll of the paste-applying mechanism will be brought into contact with the upper face of the last inturned flap; and means for folding the fourth or last upstanding flap down upon the upper face of the flap to which adhesive has just been applied.

21. In a packaging machine, the combination of mechanism for folding the upstanding end of a bag to close the same; and a paste-applying mechanism adapted to apply paste to one of the inturned flaps, said mechanism comprising a paste receptacle, a roll mounted in the lower end thereof, a support on which said receptacle is mounted, means for holding said support in a normally elevated position, a cam adapted to move the roll into contact with the end of the inturned flaps at a predetermined time, and a yielding member adapted to coact with said cam, said member extending downwardly from the support.

22. In a packaging machine, the combination of means for supporting a filled bag; means for forming oppositely-disposed initial folds therein; a plate adapted to overlie said folds; and folding mechanism adapted to fold the remaining upstanding flaps successively down upon said plate.

23. In a packaging machine, the combination of means for folding the upstanding end of a package; a paste-receptacle; a paste-roll mounted in the lower end thereof; a rocking support for said paste-receptacle; means for normally elevating said support and thereby holding the roll out of the path of travel of the package; a cam adapted to draw said support downwardly; a yielding connection between said cam and the support; and means for traversing the package past the folding means and the paste roll.

24. In a packaging machine, the combination of means for infolding the upstanding end of a package; a plate adapted to rest upon the last inturned flap; means for placing a stamp over the flaps and alongside of said plate; means for elevating the package and the plate aforesaid; means coöperating with the stamp as the package is elevated to bring the stamp into contact with the sides of the package; and a second plate adapted to rest upon the stamp on the upper end of the package.

25. In a packaging machine, the combination of a bag-form adapted to hold a filled bag; means for infolding the upstanding end of the bag; a plate contacting with a portion of the last inturned flap and serving to hold the same in its proper position; a package-guide located in line with the bag-form; means for moving the bag endwise out of said form into and through the guide; means for presenting a stamp in line with the end of the bag to one side of the plate aforesaid; means for carrying the ends of the stamp down in contact with the sides of the bag; a plate adapted to coact with the major portion of the stamp which overlies the upper end of the bag, said plate moving upward with the bag as the same is moved through the guide in the act of applying the stamp, and means for moving the bag through the guide.

26. In a packaging machine, the combination of a pocket or holder adapted to receive a filled bag; means for infolding the upstanding edge of the bag; a guide-way standing in line with the bag-holder; means for drawing a stamp through said guide-way in line with the bag as it is moved therethrough; a push-plate standing in line with the lower end of the bag and adapted to move outwardly from the bag-form and through the guide-way; a plate resting upon the last inturned flap at the upper end of the bag adjacent to the outer edge thereof; means for moving said plate and the push-plate in unison as the bag is elevated; means for carrying the ends of the stamp against the sides of the bag; and a plate adapted to rest upon the main body of the stamp and to hold the same upon the upper end of the bag as the ends of the stamp are brought to position with reference to the bag.

In testimony whereof I have signed my name to this specification in the presence of two subscribing witnesses.

GEORGE W. GWINN.

Witnesses:
  R. L. PATTERSON,
  M. M. WHEDBEE.